(12) United States Patent
Marsh

(10) Patent No.: US 10,416,187 B2
(45) Date of Patent: Sep. 17, 2019

(54) ELECTROMAGNETIC BOAT SPEEDOMETER HAVING REMOVABLE ELECTRODES

(71) Applicant: BrickHouse Innovations, LLC, Frederick, MD (US)

(72) Inventor: Lawrence B. Marsh, Frederick, MD (US)

(*) Notice: Subject to any disclaimer, the term of this patent is extended or adjusted under 35 U.S.C. 154(b) by 145 days.

(21) Appl. No.: 15/223,755

(22) Filed: Jul. 29, 2016

(65) Prior Publication Data

US 2016/0377646 A1  Dec. 29, 2016

Related U.S. Application Data

(63) Continuation of application No. 13/935,933, filed on Jul. 5, 2013, now Pat. No. 9,429,588, which is a
(Continued)

(51) Int. Cl.
| | |
|---|---|
| *G01P 5/08* | (2006.01) |
| *G01F 1/58* | (2006.01) |
| *G01F 25/00* | (2006.01) |

(52) U.S. Cl.
CPC ............. *G01P 5/08* (2013.01); *G01F 1/588* (2013.01); *G01P 5/083* (2013.01); *G01P 5/086* (2013.01); *G01F 25/0007* (2013.01)

(58) Field of Classification Search
CPC . G01C 13/006; G01P 3/50; G01P 3/52; G01P 3/54; G01P 5/08; G01P 5/083;
(Continued)

(56) References Cited

U.S. PATENT DOCUMENTS

| | | |
|---|---|---|
| 3,119,960 A | 1/1964 | Kenyon |
| 3,372,589 A | 2/1968 | Mannhertz |
| | (Continued) | |

FOREIGN PATENT DOCUMENTS

| | | | | |
|---|---|---|---|---|
| GB | 2292613 A | * | 2/1996 | ............. G01F 1/584 |
| GB | 2312515 A | * | 10/1997 | ............... G01F 1/58 |
| WO | 2007/083103 A2 | | 7/2007 | |

OTHER PUBLICATIONS

Langston, L.S. and Kasper, R.G. "Analysis of an Electromagnetic Boundary Layer Probe for Low Magnetic Reynolds Number Flows", Transactions of the ASME, Dec. 1993 pp. 726-731, vol. 115 (Year: 1993).*
(Continued)

*Primary Examiner* — Justin Seo
*Assistant Examiner* — David L Singer
(74) *Attorney, Agent, or Firm* — Laubscher & Laubscher, P.C.

(57) ABSTRACT

An electromagnetic speedometer for a boat having hull containing an opening includes an electromagnetic coil supported by the hull for establishing an electromagnetic field in the water adjacent the hull opening. A plurality of electrodes are supported by an arrangement that both closes the hull opening and supports the electrodes in engagement with the water adjacent the hull opening. The electrodes are connected by conductors with a velocity measuring circuit arranged above the hull interior surface. Preferably, the electrode support arrangement includes guide tubes supporting the electrodes for removal relative to the boat hull, thereby to permit cleaning of the electrodes. The guide tubes are closed by valves when the electrodes are removed from the assembly. In one embodiment, the electromagnetic coil is of the end-fired type, and in another embodiment, the
(Continued)

electromagnetic coil is annular and is arranged above and below the hull.

9 Claims, 15 Drawing Sheets

Related U.S. Application Data continuation-in-part of application No. 13/587,876, filed on Aug. 16, 2012, now abandoned.

(58) Field of Classification Search
CPC . G01P 5/086; G01F 1/58; G01F 1/584; G01F 1/588; G01F 1/60
USPC ... 73/861.11–861.17, 493, 514.39, 488, 181, 73/170.11
See application file for complete search history.

(56) References Cited

U.S. PATENT DOCUMENTS

| | | | |
|---|---|---|---|
| 3,620,079 A * | 11/1971 | Nosley | G01F 1/58 73/861.15 |
| 3,940,983 A | 3/1976 | Greene | |
| 4,079,626 A | 3/1978 | Gardner | |
| 4,125,019 A | 11/1978 | Cushing | |
| 4,308,753 A * | 1/1982 | Olson | G01P 5/086 73/170.11 |
| 4,389,898 A | 6/1983 | Long et al. | |
| 4,554,828 A | 11/1985 | Doll | |
| 4,653,319 A | 3/1987 | Parsonage | |
| 4,848,146 A * | 7/1989 | Bruno | G01P 5/08 73/181 |
| 5,110,310 A | 5/1992 | Hobbs | |
| 5,186,050 A * | 2/1993 | Lagace | B63B 17/0018 73/187 |
| 5,398,552 A * | 3/1995 | Marsh | G01F 1/584 73/861.11 |
| 5,583,289 A | 12/1996 | Wiggerman et al. | |
| 5,838,635 A | 11/1998 | Masreliez | |
| 5,866,823 A * | 2/1999 | Scarpa | G01F 1/584 73/861.16 |
| 6,598,487 B1 | 7/2003 | Marsh | |
| 6,904,798 B2 | 6/2005 | Boucher et al. | |
| 6,939,411 B2 | 9/2005 | Serpa | |
| 7,877,174 B2 | 1/2011 | Walser et al. | |
| 8,434,371 B2 | 5/2013 | Marsh | |
| 2006/0095217 A1* | 5/2006 | Coursolle | G01F 1/58 702/49 |

OTHER PUBLICATIONS

Naranjo, Ralph J. "Cracking the Leeway Code Can an Electromagnetic Knot Log Measure Side Slip with decision?", Practical Sailor, May 2016 pp. 12-16, vol. 42 No. 5 Timothy H, Cole, Publisher, Sarasota, Florida. (Year: 2016).*
Kostantinos et al, Master's Thesis: A CFD Investigation of Sailing Yacht Forebodies in Head Seas, Chalmers University of Technology, Shipping and Marine Technology, Master's Thesis 2015:X-15/333 (Year: 2015).*
NORTEK Racing Article, 2012.
Airmar Brochure, 2015.
Ben Marine ALIZE and ANTHEA Speed Log Brochures, 2015.
AGILOG2 Electromagnetic Log System, 2015.
Dewey Electronics Brochure, 2015.
Sitep Brochure, 2012.
Yogogawa Brochure, 2012.
Naviknot Brochure, 2012.

* cited by examiner

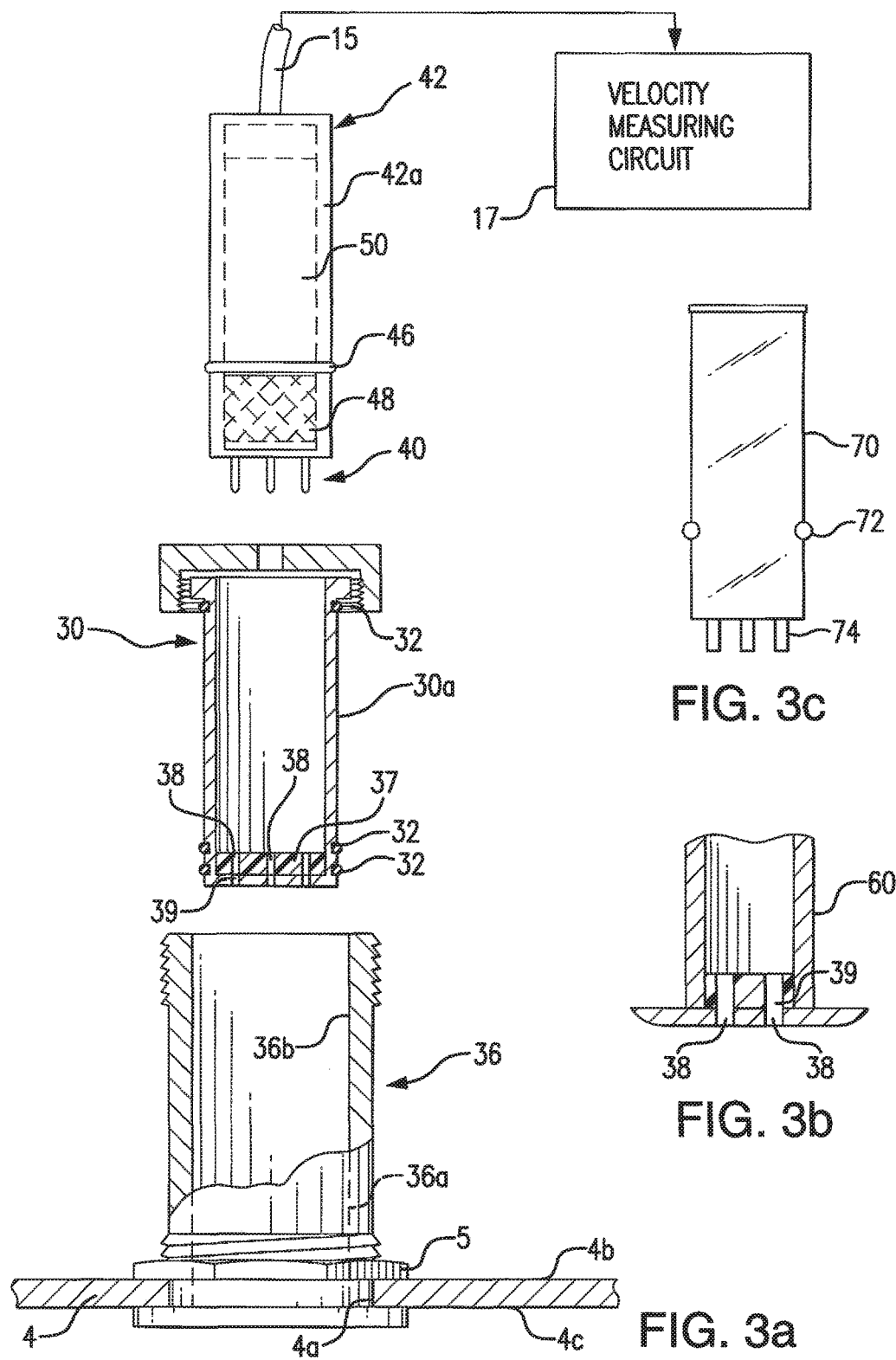

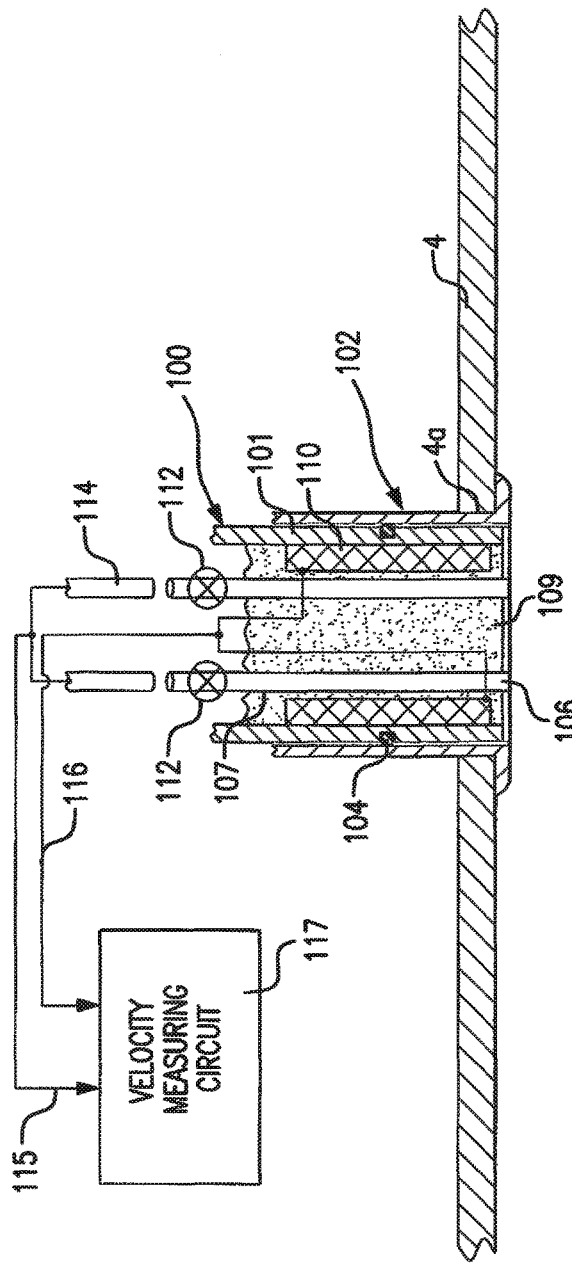
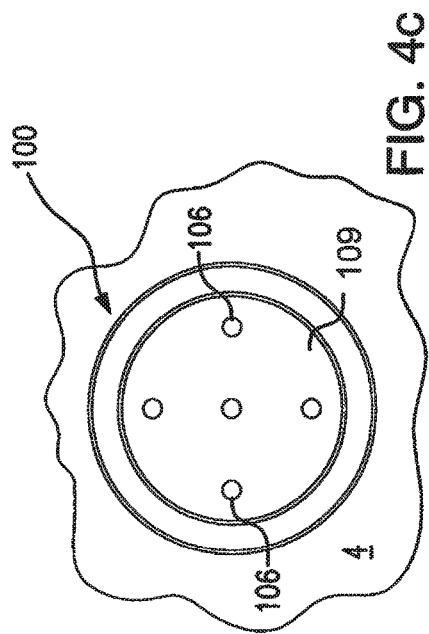
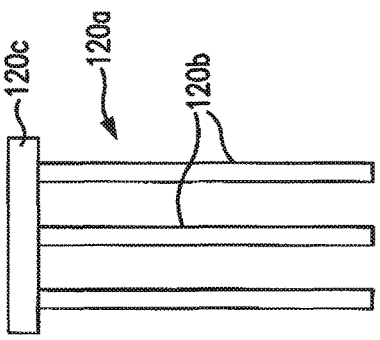
FIG. 4a
FIG. 4b
FIG. 4c

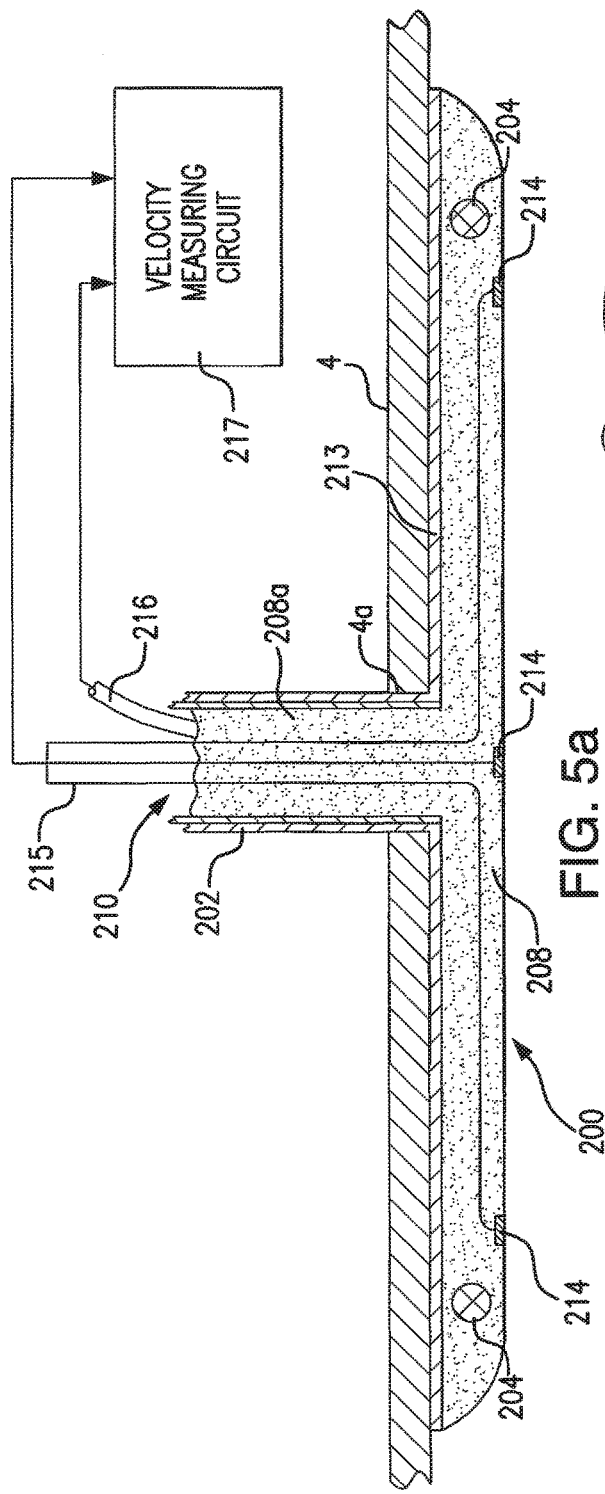
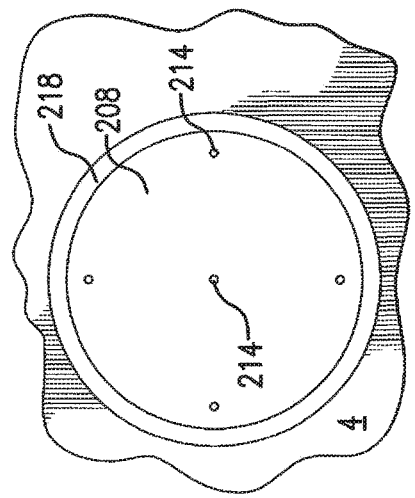

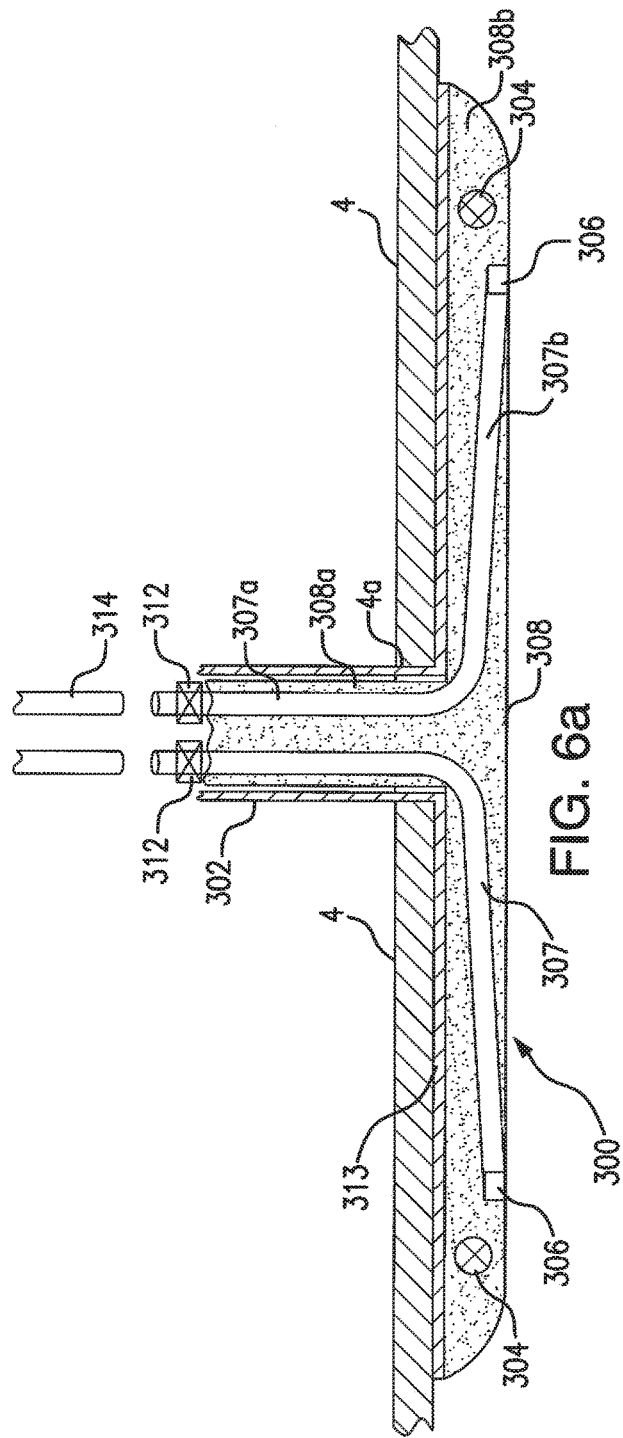
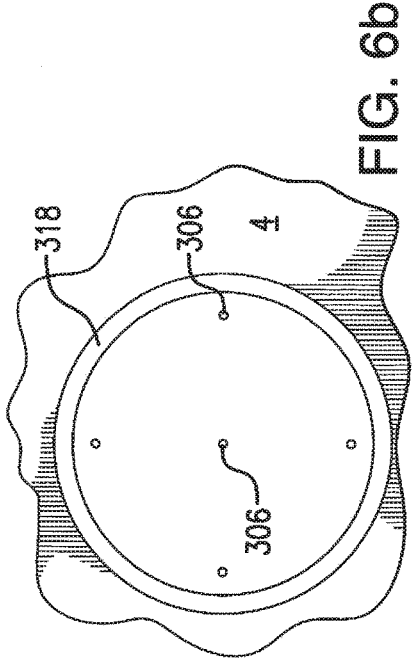

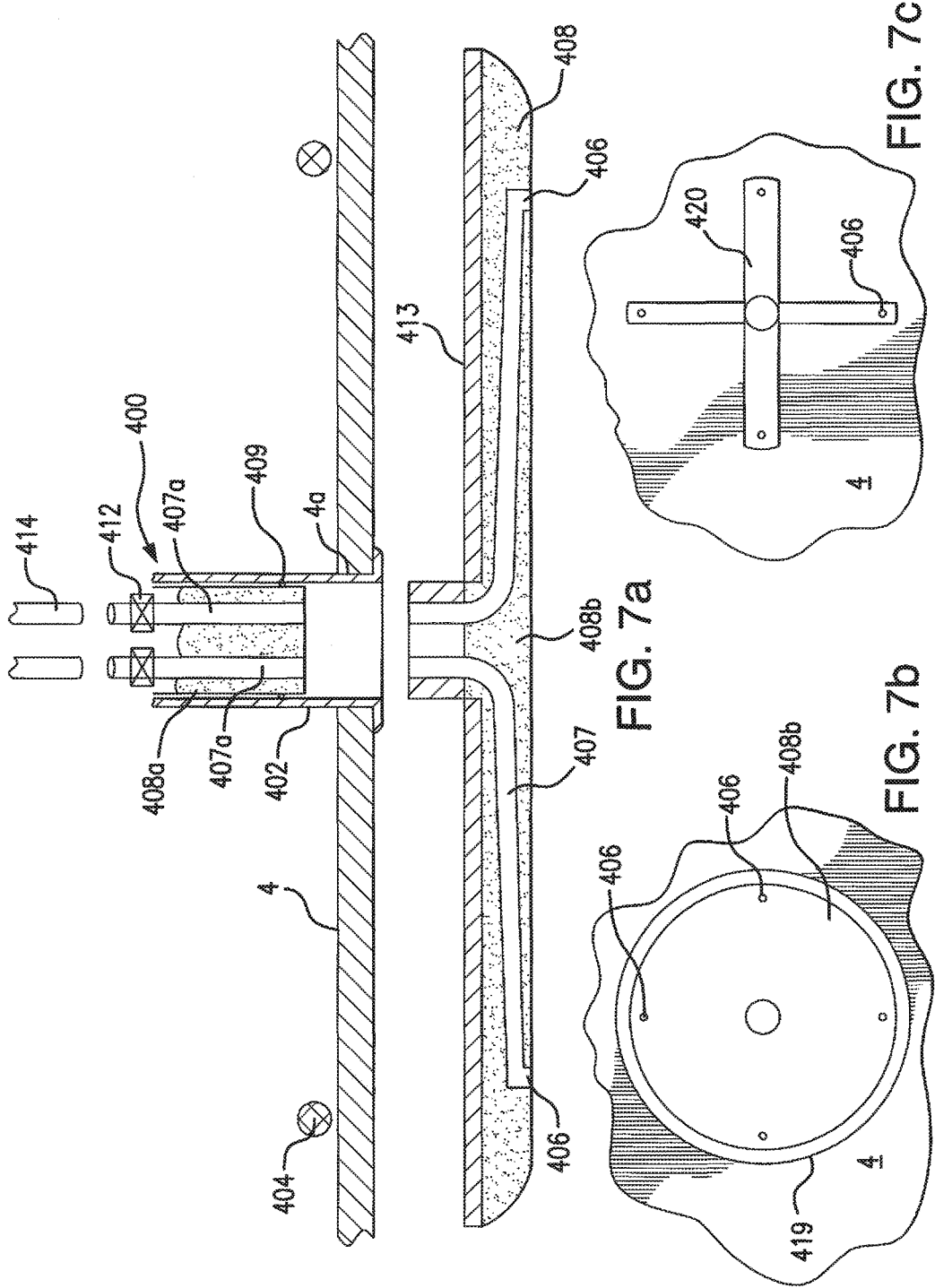

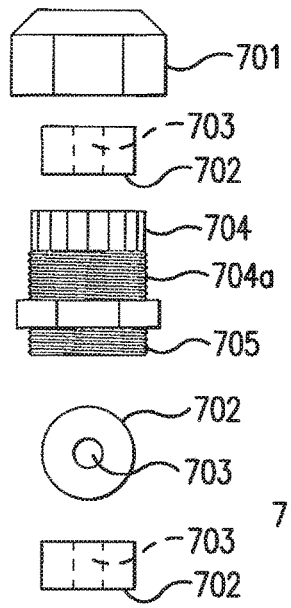
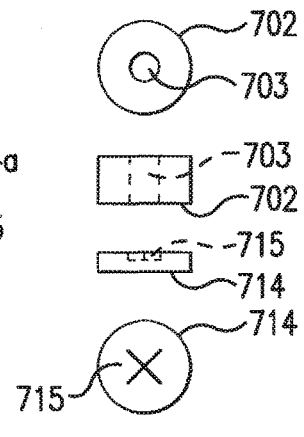
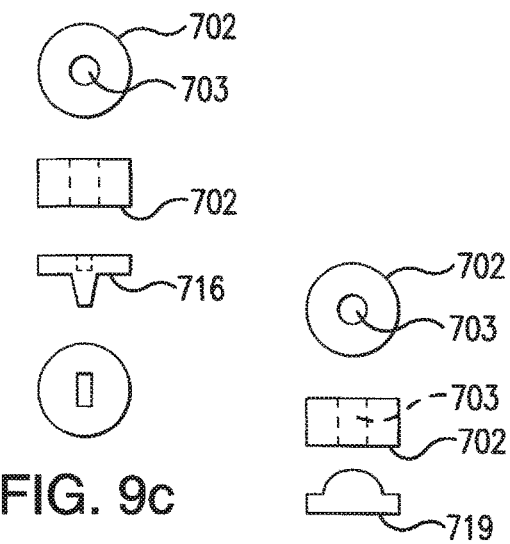
FIG. 9a
FIG. 9b
FIG. 9c
FIG. 9d
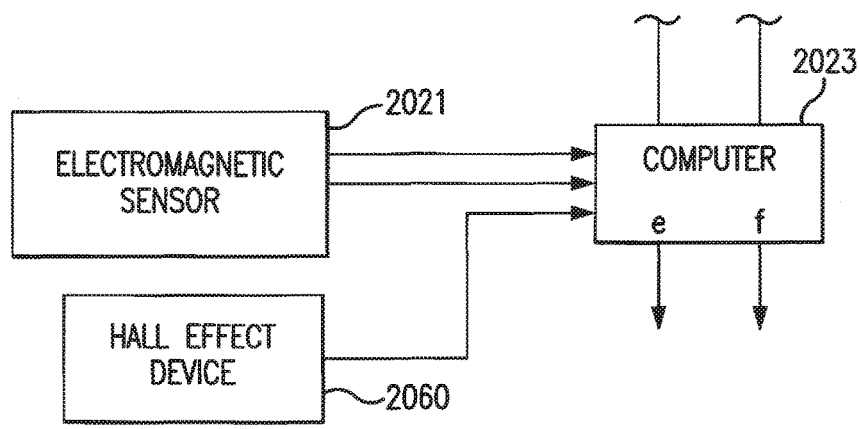
FIG. 18

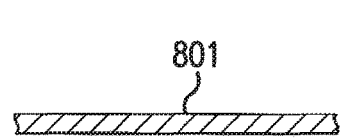
FIG. 10a
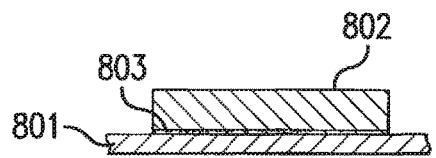
FIG. 10b
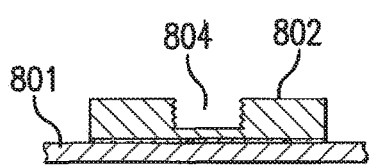
FIG. 10c
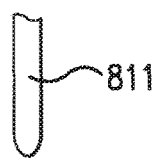
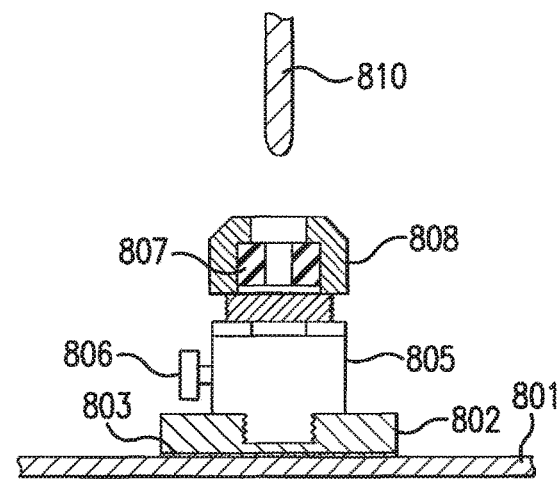
FIG. 10d
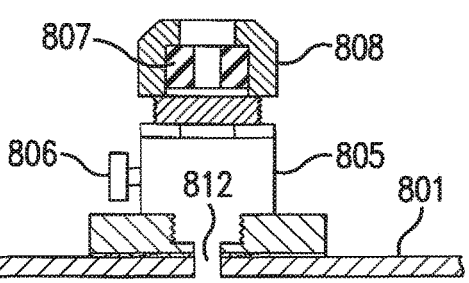
FIG. 10e
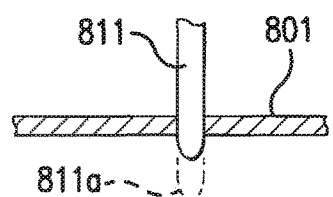
FIG. 10f

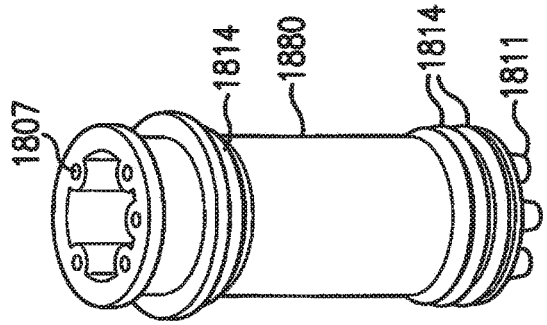
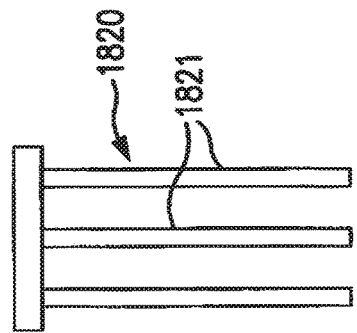
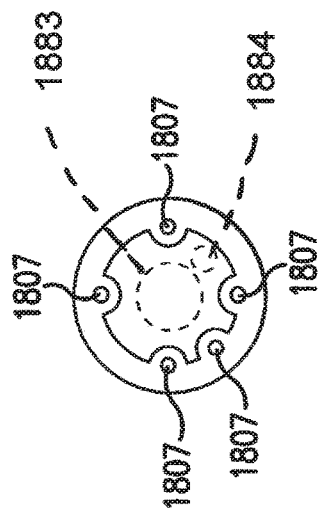
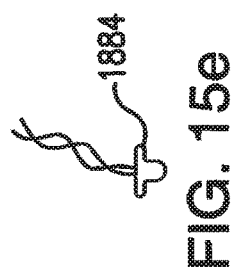
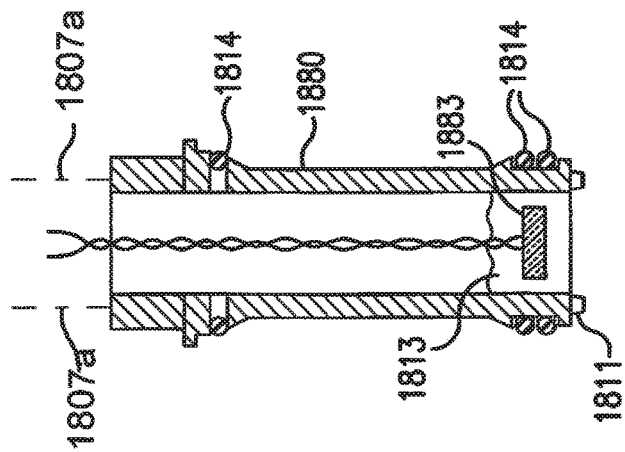
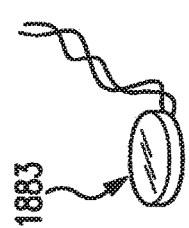

ELECTROMAGNETIC BOAT SPEEDOMETER HAVING REMOVABLE ELECTRODES

REFERENCE TO RELATED APPLICATION

This application is a continuation application of parent application Ser. No. 13/935,933 filed Jul. 5, 2013 (now U.S. Pat. No. 9,429,588 issued Aug. 30, 2016) entitled "Electromagnetic Boat Speedometer Having Removable Electrodes", which in turn is a continuation-in-part of U.S. application Ser. No. 13/587,876 filed Aug. 16, 2012 in the name of Lawrence B. Marsh entitled "ELECTROMAGNETIC BOAT SPEEDOMETER".

BACKGROUND OF THE INVENTION

Field of the Invention

An electromagnetic speedometer for a boat having hull containing an opening includes an electromagnetic coil supported by the hull for establishing an electromagnetic field in the water adjacent the hull opening. A plurality of electrodes are supported by an arrangement that both closes the hull opening and supports the electrodes in engagement with the water adjacent the hull opening. Preferably, the electrode support arrangement includes guide tubes supporting the electrodes for removal relative to the boat hull, thereby to permit cleaning of the electrodes. The guide tubes are closed by valves when the electrodes are removed from the assembly.

Description of Related Art

Electromagnetic flowmeters for measuring the flow of fluid in pipes are well known in the patented prior art, as shown by the inventor's Marsh U.S. Pat. No. 6,598,487, and the patent to Gardner U.S. Pat. No. 4,079,626.

In the boating industry, most pleasure craft utilize some sort of speed indicating device to determine the boat's speed relative to the water. Typical of such devices are paddle wheels (impellers), pitot tubes, ultrasonic sensors and electromagnetic sensors. Typical of such electromagnetic speed sensors and ultrasonic speed sensors that can utilize standard thru-hole fittings, such as the "Electromagnetic Log Sensor" manufactured by nke Marine Electronics, of Hennebont, France, and the "ALIZE Electromagnetic Speed Log" manufactured by AmeSys International, of Aux-en-Provence, France.

Paddle wheels and pitot tubes are prone to repeated fouling by marine growth as well as by debris in the water; whereas, ultrasonic sensors and EM sensors are less prone to foul. However, most all speed sensors are designed so that they can be removed from the boat and cleaned, even when the boat is in the water.

To facilitate the removal process, manufacturers typically supply the boat owner with a "sea valve" or a special thru-hull penetration that allows the boat owner to insert various sensors that must make contact with the water to properly function. Typically these sensors include "O-rings" that prevent water from leaking into the boat through this hull penetration.

Typically, the thru-hull penetration is approximately 1.5 inches in diameter creating a hole of approximately 1.75 square inches. FIG. 1 shows such a device. FIG. 2 shows the size and shape of a typical sensor along with its "O-rings". When a boat owner is removing the sensor for periodic cleaning, he will typically first remove the actual sensor and then immediately install in the open hole a "dummy" sensor or "blank" to prevent the rapid inrush of water into the boat. If done properly, less than a gallon of water will flow into the bilge of the boat. Many users, however, are fearful of performing this procedure while their boat is in the water and will wait until the boat is pulled from the water to perform this operation. Some manufacturers of thru-hull penetrators have designed special back-flow flaps that attempt to reduce the inflow during maintenance. However, concerns still exist about the removal of a sensor while the boat is in the water.

A second problem associated with most existing boat speedometers is that the speed measurement is made very close to the boat's hull and in such a small volume of water that the speed measurement can be adversely effected by the boat's hull especially at high speeds and on larger boats. To partially compensate for effects of the boundry layer on the accuracy of the speed measurement users typically perform "at sea" calibrations over a range of speeds and establish corrections in the reported Speeds of the speedometer.

In the inventor's prior Marsh U.S. Pat. No. 6,598,487, a magnetic flowmeter is disclosed for measuring the flow of fluid in a conduit, including a separable electrode assembly in which a plurality of linear electrodes extend through self-sealing glands. This prior teaching differs from the measurement of the speed of a boat, since in the electromagnetic speedometer of the present invention, the sensor magnet and electrode means are specifically designed for mounting in an opening contained in the hull of the boat.

SUMMARY OF THE INVENTION

Accordingly, a primary object of the present invention is to provide an electromagnetic speedometer for a boat having hull containing an opening includes an electromagnetic coil supported by the hull for establishing an electromagnetic field in the water adjacent the hull opening. A plurality of electrodes are supported by an arrangement that both closes the hull opening and supports the electrodes in engagement with the water adjacent the hull opening. Preferably, the electrode support arrangement includes guide tubes supporting the electrodes for removal relative to the boat hull, thereby to permit cleaning of the electrodes. The guide tubes are closed either by a "dummy electrode assembly" or by valves when the electrodes are removed from the assembly.

A further object of the invention is to provide an electromagnetic velocity sensor whose electrodes can be removed for maintenance with virtually no inflow of water.

Another object of the invention is to provide an electromagnetic velocity sensor whose electrodes can be raised or lowered to allow for positioning relative to the bottom of the hull.

Another object of the invention is to provide an electromagnetic speedometer for boats in which a tubular penetrator member is mounted in an existing hull opening, and an adapter is provided for mounting an end-fired electromagnetic coil in the penetrator such that no water enters the boat through the hull opening. In a modification, the end-fired electromagnetic coil is mounted in the penetration member without the use of an adapter. In another embodiment, the electromagnetic coil is annular, and the support means includes an inverted mushroom-shaped body having a stem portion that extends upwardly into the penetrator body. In a further embodiment, the electromagnetic coil is annular and is located separate from the electrode assembly. According to still another embodiment, the boat hull contains a plurality of openings, each having associated therewith an electrode, an electrode guide tube, and either a "dummy electrode assembly" or a self-sealing valve device for closing the guide tube when the electrode is removed there from.

According to a preferred embodiment, the electrode assembly is mounted within a molded part that fits into a standard hull penetrator and where the magnet assembly is either of the solenoid or annular style of such a size as to fit around the hull penetrator, and positioned such as allowing its magnetic field to penetrate the hull. According to another embodiment, the coil is annular of a size that is larger than that used in the retrofit configuration and having individual electrodes positioned inside of the annular coil. A method is described as how to install such electrodes through individual penetrations such that the boat does not need to be placed in dry dock to accomplish this operation.

According to another object of the invention, inventive designs are provided that allow for the measurement of substantially larger volumes of water, thereby significantly reducing the effects of the hull on the speed measurement. Additionally, the sensor can be configured either to sense only one axis of flow or, to measure both the fore-aft speed and the cross flow from port to starboard.

The electromagnetic velocity sensor is suitable for use on pleasure boats and other small water craft where the sensor or the sensing electrodes can be easily removed for cleaning without a large inrush of water. In general, this is accomplished by using either a "dummy electrode assembly" or a self-sealing electrode assembly that substantially seals against water intrusion. Additionally, improved methods are provided for measuring the flow beyond the immediate boundary layer of a moving boat.

According to a further object of the invention, the measurements of both forward speed and the leeway relative to the water are combined with GPS signals which measure the boat speed relative to land, thereby to obtain direct measurement of the local currents that exist in the water.

BRIEF DESCRIPTION OF THE DRAWINGS

Other objects and advantages of the invention will become apparent from a study of the following specification, when viewed in the light of the accompanying drawing, in which:

FIG. 3a is an exploded view illustrating an initial embodiment of the invention depicting the manner in which an adapter member serves to mount a sensor of the end-fire electromagnetic coil type sensor in a penetration member that is mounted in a hull opening; and FIG. 3b is a detailed sectional view of a modification of the valve means of FIG. 3a, and FIG. 3c is a side view of a dummy plug with multiple electrodes that is used to prevent inflow into the boat whenever the standard sensor is removed for cleaning or repair;

FIG. 4a is a sectional view illustrating another embodiment for removably supporting the electrodes of an end-fire electromagnetic coil arrangement in a penetrator member, FIG. 4b is a side view of a dummy plug used in connection with the apparatus of FIG. 4a, and FIG. 4c is a detailed bottom view of the apparatus of FIG. 4a;

FIG. 5a is a sectional view of another embodiment of the invention using a standard penetrator member, and FIG. 5b is a bottom view of a modification of the apparatus of FIG. 5a;

FIG. 6a is a sectional view of another embodiment of the invention, and FIG. 6b is a bottom view of a modification of the apparatus of FIG. 6a;

FIG. 7a is a sectional view of another embodiment of the invention, and FIGS. 7b and 7c are bottom views of modifications of the apparatus of FIG. 7a;

FIGS. 8b and 8c are detailed sectional view of valve arrangements for use with the apparatus of FIG. 8a;

FIG. 9a is an exploded view of a standard cable gland assembly that can be modified to function as the valve assembly for individual electrodes, and FIGS. 9b-9d are exploded views illustrating various sealing arrangements adapted for use with the apparatus of FIG. 9a;

FIGS. 10a-10f are detailed views illustrating how the individual electrodes can be installed in a standard hull that is formed of solid fiberglass;

FIG. 15a is a longitudinal sectional view of another embodiment of the invention; FIGS. 15b and 15c are bottom and perspective views of the sensor core device of the apparatus of FIG. 15a, respectively; FIGS. 15d and 15e are perspective vies of the piezoelectric crystal and temperature devices, respectively; and FIG. 15f is a side elevation view of a dummy plug designed for use with the apparatus of FIG. 15a;

FIG. 18 is a circuit diagram illustrating the manner in which a magnetic field detecting device is connected with the electronic circuitry.

DETAILED DESCRIPTION OF THE INVENTION

Figure 1:
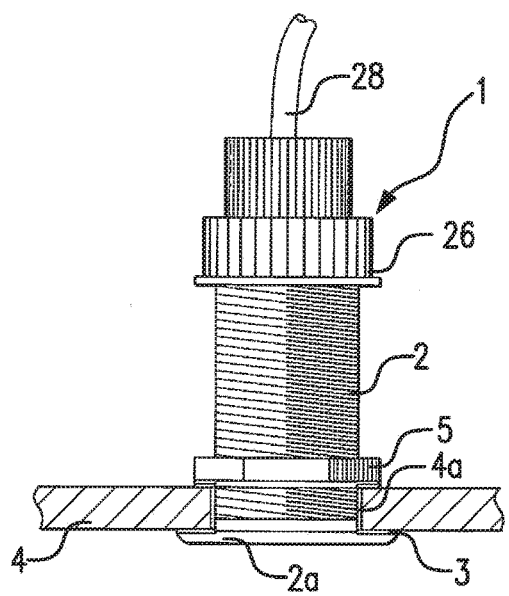
FIG. 1 is a sectional view illustrating the manner in which a penetrator member of the prior art is mounted in a boat hull opening.

Referring first more particularly to FIG. 1, it is known in the prior art to provide a sensor for use in pleasure boats where a thru-hull mount already exists. A standard thru-hull penetrator 1 is typical of those used for impeller-type, electromagnetic, and ultrasonic speedometers. This penetrator includes a cylindrical body 2 having at one end a flange portion 2a and an annular rubber gasket 3 that reside on the water-side of the boat hull 4. An associated hull locking nut 5 keeps the assembly in place in the hull through opening 4a.

The body of the penetrator extends into the boat approximately 3 inches. The penetrator body contains a smooth cylindrical cavity through which a standard sensor housing is inserted.

Figure 2:
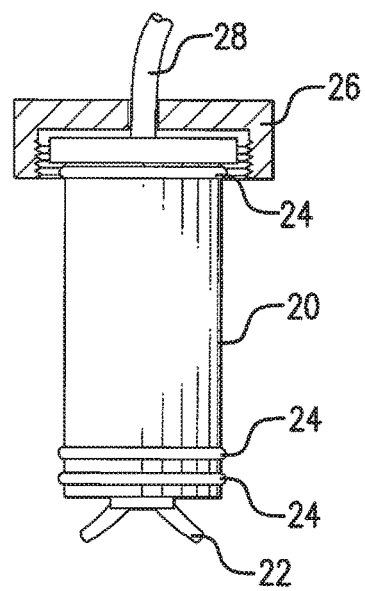
FIG. 2 is a side elevation view of a paddle-wheel-type velocity measuring device of the prior art that is used in connection with the penetrator member of FIG. 1.
Figure 16A:
FIGS. 16a-16f are schematic illustrations of the preferred locations of the electromagnetic speedometer on various types of boats.
Figure 16B:
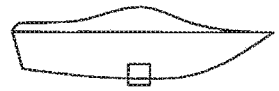
Figure 16C:
Figure 16D:
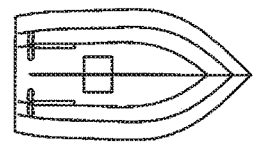
Figure 16E:
Figure 16F:
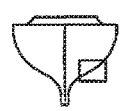

FIG. 2 illustrates a typical prior art mechanical sensor, for example, a sensor 20 of the type including a paddle wheel 22. The paddle wheel 22 protrudes approximately ½ inch beyond the hull 4 so it can be affected by the movement of the boat through the water. O-rings 24 arranged concentrically about the sensor body prevent water from entering the boat when either a sensor or a "dummy" sensor is in place. Lock nut 26 fastens the sensor 20 within the penetrator 2, and an output cable 28 extends from the sensor.

Referring now to FIG. 3a, according to an first embodiment of the invention designed to mate with a standard boat hull penetrator 36 mounted in hull opening 4a, a special adaptor 30 having a tubular body 30a is configured to correspond with the outside surface of a dummy plug so as to provide similar sealing with O-rings 32 against the penetrator inner wall 36a. It differs, however, in that its end is not solid, but rather includes a resilient layer 37 containing passages 38 that permit the electrodes 40 of electromagnetic velocity sensing means 42 to extend therethrough. The electrodes are connected by conductors 15 to velocity measuring circuit means 17. These electrodes are small in diameter, typically being approximately ⅛" in diameter. The opening caused by each electrode is approximately 0.012 square inches. Therefor, five electrodes would have a combined area of approximately 0.06 square inches. This combined opening is more than 100 times less than the opening caused a standard hull penetrator. The small holes through which the electrodes pass allow less than 1% of the water that can enter the boat, such as occurs, for example, when the entire paddlewheel sensor of FIG. 2 is removed.

It should be noted that typically, the water pressure that exists at the sensor location on a typical boat is less than 5 psi, much less than that seen in industrial processes. When the EM sensor is not in place, even a small amount of water can he prevented from entering by the use of a dummy electrode plug or by using self-sealing valves. Also contained inside the adaptor body is a rubber seal assembly that prevents water from entering the adaptor body (and, subsequently, the boat) when the sensor is not in place. This sealing assembly consists of either a plurality of through holes that snuggly fit around the electrodes of either the actual sensor or a dummy sensor (as shown in FIG. 2 or 3d), or a plurality of small valves 39 arranged in the passages 38, respectively, which valves are rubber "duckbill" valves or dome valves similar to those manufactured by Vernay Laboratories, Inc, (and illustrated in FIG. 8c). Thus, in this embodiment, the electromagnetic sensing means 42 is arranged above the upper interior surface 4b of the hull, with the lower exterior surface 4c of the hull and the tips of the electrodes 40 being exposed to the water.

The electromagnetic sensor means 42 includes a cylindrical outer body 42a provided with an associated O-ring 46 that fits through the central passage of the adaptor tubular body 30a, a plurality of electrodes 40 affixed to one end of the sensor body, an electromagnetic coil 48 contained within the sensor body 42a adjacent the electrodes 40, and electronic signal processing means 50 are positioned within the remaining inside portion of the sensor body. An output cable 15 connects the electronic processing means to the velocity measuring and display means 17 of the boat.

FIG. 3b illustrates a modification of a thru-hull penetrator 60 that incorporates the electrode holes 38 and self-sealing valves 39 shown in FIG. 3a. The advantage afforded here is that a special intermediate adaptor body is not required. On the other hand, the disadvantage of this special penetrator is that the boat owner could replace his standard penetrator with this special penetrator only when the boat is out of the water. The purpose of this configuration is to allow the sensor to fit into a standard hull penetrator 36. This requires an adaptor piece 30. Multiple pieces are more expensive than a single piece. The seals 38 placed at the bottom of the adaptor would be difficult for user to keep clean. Also, water can accumulate in the lower cavity of the adaptor and cause difficulties in the insertion of the sensor 42.

When using the embodiment of FIG. 3a, a boat owner can remove the sensor for cleaning without concern that a significant amount of water will enter the boat. Additionally, if the rubber sealing assembly were to need replacement due to mechanical wear, then the adapter body could be removed and replaced with a "dummy sensor" while repairs are made - - - or alternately, be replaced by a new adaptor body. Such a dummy sensor is shown in FIG. 3c, wherein the insertion body 70 contains O-rings 72 and dummy electrodes 74. These dummy electrodes are of the same size as the standard electrodes and are used when the sensor is removed for any extended period of time.

In this embodiment, the magnet is of the "end-fire" type in which the magnetic field emanates from the end of the sensor and into the water. The velocity signal, detected by the electrodes of the electromagnetic sensor, is representative of the velocity very near the hull - - - similar to what a paddle wheel or impeller device would measure. The detection volume of this configuration is a hemisphere whose diameter is approximately equal to the distance between the sensing electrodes. It has been discovered that if the electrodes are positioned at a small distance from the outside hull and slightly into the flowing stream (approximately ¼ to ½"), then the effects of the boundry layer on detected flow signal will be reduced. Therefor, the electromagnetic sensor can be designed so as to allow the user to position the sensor within the hull penetrator to achieve improved accuracy, albeit at the expense of having the electrodes extend beyond the hull. (See FIG. 10f) In either case, at sea, calibrations will correct for measurements on any specific boat. In spite of the fact that extending the electrodes into the flow stream at a short distance from the outer hull, the measuring volume is still small and subject to small changes in the boundry conditions. Typically, the standard thru-hull penetrators are positioned on one side of the hull's centerline - - - not on the centerline. The accuracy of such a device can be affected by the boundary layer flow conditions. However, for those boaters who want a drop-in replacement for their existing mechanical meter, then this will likely be acceptable because the accuracy will be about the same but will have reduced fouling, less leakage upon sensor removal, and the potential for measuring both axes of speed (velocity). The embodiment of FIG. 3a utilizes both a special adaptor with self-sealing penetrator holes and a standard thru-hull penetrator.

Referring now to the embodiment illustrated in FIGS. 4a-4c, the electromagnetic sensor 100 is designed for use with a standard penetrator 102 mounted directly in hull opening 4a, without the need for having an intermediate adaptor as in the previous embodiment. In this embodiment the standard thru-hull penetrator is installed in the boat hull 4. The sensor body 101 is provided with an external O-ring seal 104, and contains hollow guide tubes 107 supported by potting material 109 and having at their lower ends electrode openings 106, electromagnetic coil 110, valves 112, and removable electrodes 114. In typical operation, the sensor body 101 is inserted into the penetrator 102, whereupon O-rings 104 prevent any water from entering into the boat. Electrodes 114 are inserted into their operating positions through the respective guide tubes 107 and manually operable valves 112. The tips of the electrodes 114 are positioned just outside of the hull at the electrode holes 106 where they make contact with the water. The electromagnet coil 110 produces an electromagnetic field in the water such that, when it emerges from the vicinity of the boat hull, is substantially normal to the plane containing the hull 4. The voltages produced by the water flowing by the electromagnetic field produce signals that are detected by the nearby electrodes that are in contact with the water, and are transmitted by conductors 115 to the velocity measuring circuit 117. Cable 116 connects the coil 110 with the power supply of the velocity measuring circuit 117.

While the valves 112 shown in FIG. 4a could be of the typical manually-operated types, such as miniature ball valves or gate valves, the preferred valves are of the self-sealing elastomeric type such, as the small rubber "duckbill" valves or dome valves in FIGS. 9c, 9d and 9e by Vernay Laboratories, Inc. A dummy electrode assembly (FIG. 4b) can be subsequently used to prevent inflow when the sensor is removed for extended periods of time. The dummy assembly 120a is provided with dummy electrodes 120b and top mount support member 120c. This configuration is also designed to use a standard hull penetrator. In this configuration, only one sensor body is used. The self-sealing valves have been placed at the top of the sensor—this allows for easy cleaning and/or replacement. Any water in the tubes 107 will be pushed out by the electrodes upon insertion. One disadvantage of this embodiment is that the small solenoid diameter of approximately 1 inch will energize only a small volume of water causing the sensor to be more affected by water flow variations than would a larger coil.

Referring now to FIG. 5a, an extended field embodiment is shown which provides for the sensed velocity to be taken over a broader volume of water, with the majority of the signal coming from flow beyond the boundary layer of the boat. As previously stated, the larger the coil and electrode assembly the greater is the volume of water contributing to the flow signal. Such a design will provide a very accurate velocity measurement. The extended field sensor 200 shown in FIG. 5a is designed for use with a standard thru-hull penetrator 202 mounted in hull opening 4a. The annular coil 204 and electrodes 214 are placed at a lateral distance from the penetrator and are contained within a streamlined protective shroud 208 having the shaped of an inverted mushroom, with the magnetic coil 204 and the outer electrodes 214 being arranged at the outer periphery of the shroud. The shroud 208 also includes a stem portion 208a that extends within the bore of the standard penetrator 202. The sensor stem and shroud are integrally connected so that the electrodes 206, the annular electromagnet coil 204, and mounting stem 208a are all contained within potting layer 210 to define a watertight assembly. The shroud 208 is preferably flexible enough to generally conform to various boat hulls. To facilitate an even better conformance to the boat's hull, an additional annular gasket 213 is provided. To firmly secure the shroud and facilitate additional streamlining, an attachment ring 218 (FIG. 5b) may be provided that screws into the hull 4. Conductors 215 for all of the electrodes 214, and the cable 216 for the magnet coil 204 are routed through the sensor stem and subsequently to the velocity measuring circuit 217. Although this configuration allows for the measurement of speed substantially outside of the ship's boundary layer by implementing large coils, it does not allow for the removal and cleaning of the electrodes while the boat is in the water.

The embodiment shown in FIGS. 6a and 6b is designed to permit the user to remove and clean the electrodes while the boat is in the water, and underway. The sensor means 300 in this embodiment includes a shroud 308 formed of potting material and having the shape of an inverted mushroom, with the magnetic coil 304 and electrode holes 306 of the guide tubes 307 being arranged adjacent the outer periphery of the shroud body portion 308b. The stem portion 308a of the shroud extends within the standard penetrator 302 mounted in hull opening 4a. The guide tubes are curved and include first portions 307a that extend downwardly through the shroud stem portion, and second portions 307b that extend radially outwardly in the main shroud body portion 308b from the hull opening. Therefore, instead of the electrodes 314 being securely potted into fixed locations on the periphery of the shroud, they extend through a plurality of hollow guide tubes 307, thereby permitting the electrodes to be removed for cleaning. These electrodes are made of an electrically conductive, flexible material, such as stainless steel, or a composite graphite material. By incorporating in-line miniature valves 312, the electrodes may be removed without leaving pathways for the outside water to enter the boat. The sensor stem portion 308a and shroud 308 define an integral assembly, with the electrode guide tubes 307, magnet coil 304, and mounting stem 308a being potted into a watertight assembly. The shroud is flexible enough to generally conform to various boat hulls. To facilitate an even better conformance to the hull if the boat, an additional annular gasket 313 is provided. To firmly secure the shroud and facilitate additional streamlining an attachment ring 318 (FIG. 6b) may be provided that screws into the hull 4. Wires from the magnet coil are routed through the sensor stem and subsequently to the sensor electronics.

While the valves 312 shown in FIG. 6a could be of the typical manually-operated type, such as miniature ball valves or gate valves, the preferred valves would be of the self-sealing elastomeric type, such as the small rubber "duckbill" valves or dome valves shown in FIGS. 9c, 9d and 9e, similar to those manufactured by Vernay Laboratories, Inc. A dummy electrode assembly can be subsequently used to prevent inflow when the sensor is removed for extended periods of time.

While the previously described embodiment allows for the measurement of speed substantially outside of the ship's boundary layer, and allows for the removal and cleaning of the electrodes while the boat is in the water, the thickness of the shroud is increased by the magnetic coil remaining outside of the hull of the boat. Additionally, unlike the previous embodiment, if the coil were to fail during a critical sailing journey, the speedometer would remain inoperative until the boat could be removed from the water.

In the embodiment of FIG. 7a, the sensor means 400 includes a shroud body portion 408b, a shroud neck portion 408a with O-ring seal 409 extending within a standard hull penetrator 402, and an annular electromagnetic coil 404 that are all separate from each other. Guide tubes 407a containing self-sealing valves 412 are embedded in the potting layer of the shroud neck portion 408a. In particular, the annular coil 404 is located on the inside portion of the hull 4, away from the water where it could be serviced if necessary. In this embodiment, the shroud body portion 408b contains only the hollow guide tubes 407 having electrode openings 406, so it can be much thinner than the previous embodiment wherein the shroud body portion also contained the coil.

Without having to accommodate the coil within the shroud, the shroud body portion 408b, provided with the gasket 413, can take a variety of shapes, including the disc-shaped configuration of FIG. 7b provided with an attachment ring 419, and the four-armed cross shape 420 of FIG. 7c. As in the prior configurations that incorporate hollow guide tubes 407 for the removable electrodes 414, the necessary valves 412 for the guide tube portions 407a could be either of the manual inline type, or of the elastomeric self-sealing type. It should be noted that with the coil 404 placed so it is separated from the water by the thickness of the hull, the strength of the magnetic field will be insignificantly slightly reduced.

Figure 8A:
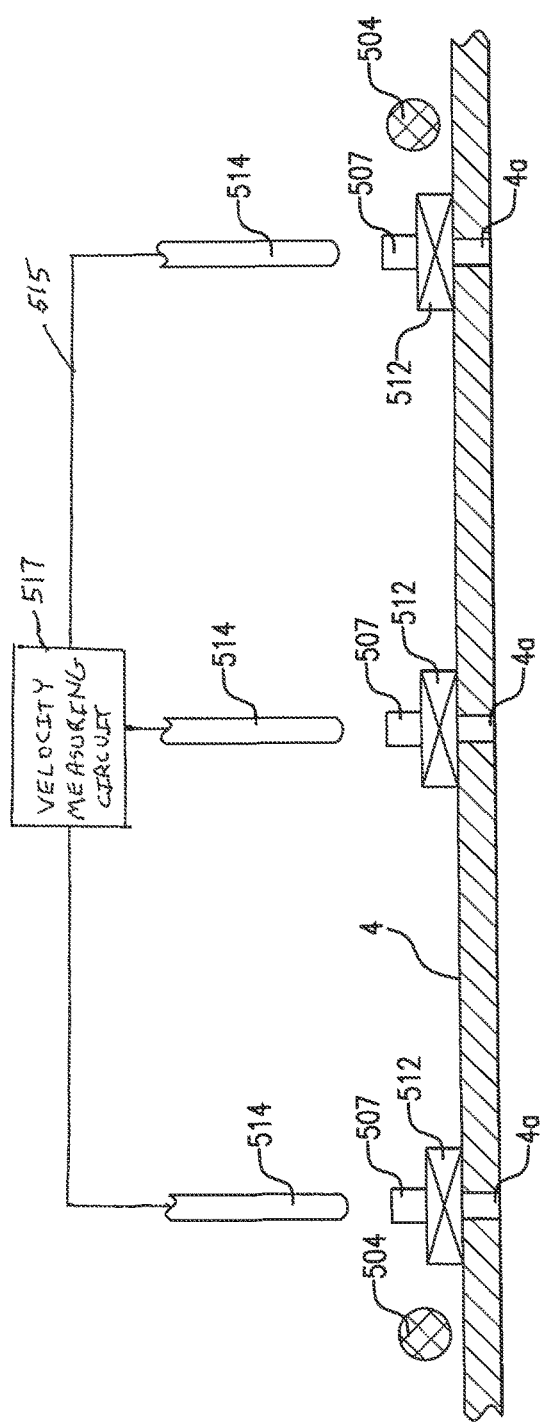
FIG. 8a is a sectional view of a further embodiment of the invention.
Figure 8C:
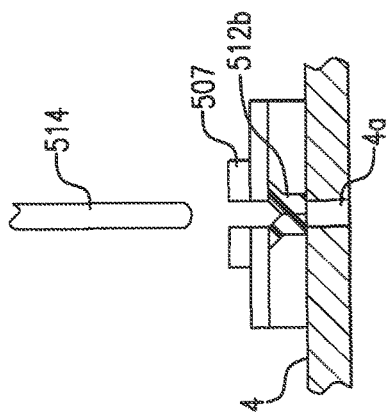
Figure 8B:
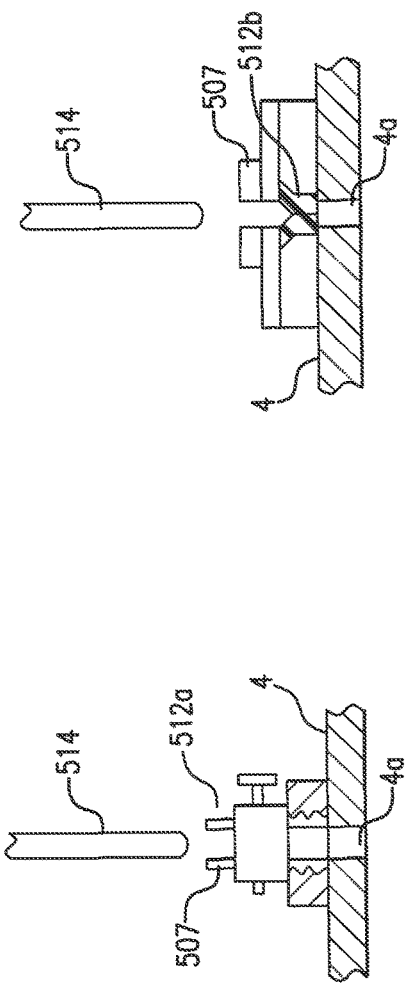

FIG. 8a illustrates an embodiment that is preferred for competitive racing boats because of the large removable coil and electrode separation distances that allow for greater measurement beyond the boundary layer, and the electrodes, which are removable for cleaning, are flush with the hull, eliminating any additional drag. In this embodiment, the standard penetrator is not used. Instead the magnet coil 504 is placed inside the boat hull 4, and the electrodes 514 are separately positioned on the inside of the hull using custom penetrator valves 512 adjacent the hull openings 4a, respectively. The benefits of this configuration are that the coil can be removed without allowing any significant amount of water to enter the boat, and the electromagnetic field is large enough to allow the speed measurement to be made substantially away from the influences of the boat's hull; that the electrodes can be removed for cleaning; and that there is no shroud to cause additional drag on the boat. FIG. 8b and FIG. 8c illustrate two of the valve arrangements that facilitate the removal of the electrodes. In FIG. 8b, the valve 512a is of the manual type, and in FIG. 8c the valve 512b is of the self-closing duckbill type. In addition to the valve, a tight fitting gland 507 is needed to prevent water from entering the boat when the electrode is in the operating position and the valve is open.

The purpose of this configuration is to provide a coil diameter that will energize the largest volume of water so as to best minimize the effects of flow variation around the hull. In this configuration the coil can be of any size that can be accommodated by the specific structure of any boat hull. Essentially, the larger the coil, the greater will be its ability to minimize the effects of flow variations around the boat hull. The electrodes will typically be placed inside the diameter of the coil, and will be of optimum performance when placed on an inner diameter that is between 75-90% of the coils inner diameter. The voltages produced by the water flowing by the electromagnetic field produce signals that are detected by the nearby electrodes that are in contact with the water, and are transmitted by conductors 515 to the velocity measuring circuit 517. As in the embodiments of FIGS. 12 and 13, the coil can be replaced without interfering with the water integrity of the boat. The configuration of FIG. 8a affords the most accurate velocity measurements of any of the configurations.

FIGS. 9a-9d illustrate typical cable gland assemblies that are often used to prevent water from entering an enclosure when a cable penetrates the wall of the enclosure. Such a device is very suitable for use in the installation and removal of the individual electrodes. FIG. 9a shows such a cable gland assembly. Threaded end 705 is designed to be threadably connected with a corresponding opening contained in a mating piece. Rubber compression seal 702 contains an opening 703 the approximate size of the electrode that is to be sealed is seated into a flexible spline portion 704 of the assembly. As top nut 701 is tightened on to threads 704a, the splines 704 are compressed together, thereby squeezing the compression seal 702 to cause the inner opening 703 to become smaller and to tighten snugly against the electrode. A standard gland assembly, when used as a means for preventing water from entering into the boat when the electrodes are in the operational position, works well. However, when the electrodes are removed from the assembly for cleaning water will enter through the small, open hole. Although a dummy electrode can be placed into the hole to prevent water entry, it can be annoying, as well as possibly dangerous for water to squirt into the boat.

FIG. 9b illustrates one manner of solving this transitional problem. In addition to the standard compression fitting 702 an additional disc seal 714 is added to the assembly. This small disc is cut with an X shaped opening 715 to allow the electrode to pass therethrough. Upon removal of the electrode, the rubber flaps will retard the entry of water into the boat. A preferred method of self-sealing is shown in FIGS. 9c and 9d. In these configurations, a separate valve assembly, such as a "duckbill" valve 716 or a dome valve 719 is placed in line with the compression seal. When the electrode is removed from the assembly, the valve snaps shut and effectively prevents water from entering the boat. Because any of the self-sealing valves may possibly become fouled by dirt or debris causing possible leakage through the fouled valve, the user will be encouraged to use "dummy electrodes" to provide a "fail safe" approach.

FIGS. 10a-10f illustrate the steps for installing the separate penetrations for the electrodes that are used with the annular coil without the necessity of removing the boat from the water. FIG. 10a shows a cross section of a typical hull 801 which is fabricated from a solid material such as wood or fiberglass, where the density of the material is generally uniform throughout. FIG. 10b shows how a backing plate 802 is attached to the hull 801 using an adhesive layer 803. Backing plates are the standard means of reinforcing a portion of a boat hull where a penetration of the hull is made. FIG. 10c illustrates a backing plate 802 that contains a threaded opening 804 to accept a threaded valve assembly 805. Referring to FIG. 10d, a valve body 805 is screwed into threaded hole 804, and attached to valve 805 is a gland assembly including a rubber compression seal 807 and top nut 808.

Drill bit 810 is used to drill a small hole into hull 801. As shown in FIG. 10e, after the small hole 812 has been formed in the hull, electrode 811 is installed. When the valve assembly 805 is closed by handle 806, the electrode 811 is inserted into the compression seal 807, which is sized to provide a snug fit, whereby no water can leak into the boat. The valve 805 is then opened, and the electrode 811 is inserted to a pre-measured depth, such that the tip 811a of the electrode 811 extends slightly beyond the outer surface of the hull 801. FIG. 10f illustrates the adjustable positioning of electrode 811 for controlling the extent to which the electrode tip protrudes into the water. To prevent leakage in this position, the top nut 808 is tightened so that the compression seal 807 is further compressed against the electrode body 811. Tightening of gland top nut 808 provides an effective sealing means at the pressures that are involved (typically less than 10 psi.)

Figure 11A:
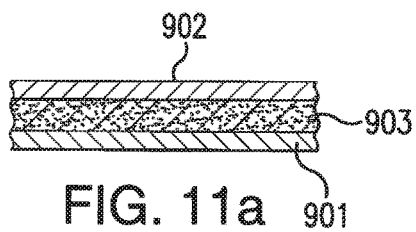
FIGS. 11a-11h are detailed views illustrating how the individual electrodes can be installed in a composite hull having a porous core.
Figure 11B:
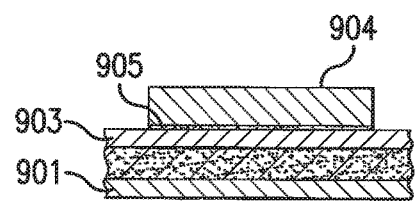
Figure 11C:
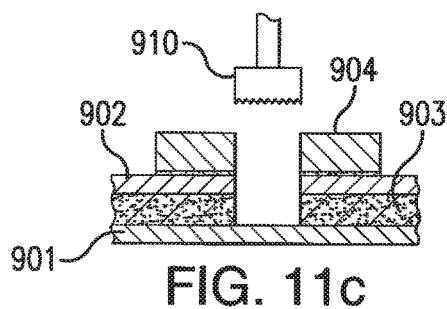
Figure 11D:
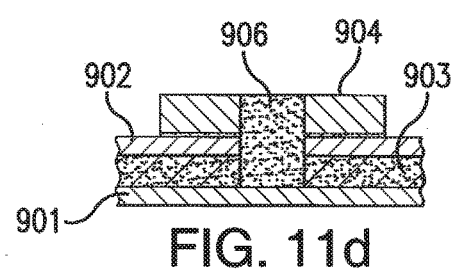

Many high performance boats are made from composite materials. FIGS. 11a-11h illustrate the steps for installing the separate penetrations for the electrodes that are used with the annular coil, without the necessity of removing the boat from the water. FIG. 11a shows a cross section of a typical hull which is fabricated from a composite core, where the central core 903 is sandwiched between upper and lower layers 902 and 901. FIG. 11b shows how a backing plate 904 is attached to the upper layer 902 by means of an adhesive layer 905. Backing plates are the standard means of reinforcing a portion of a boat hull where a penetration of the hull is made. When a hole is made in a hull that is of a laminate and where the inner core is made of a porous material such as foam or balsa, then care must be taken to prevent the water from migrating into the inner core and damaging it. To prevent this from happening a portion of the inner core must be replaced by a solid material that is immune to water penetration. FIG. 11c illustrates an oversized hole that has been cut using a circular hole saw 910. This hole is cut through both the top layer 902 and the center composite material 903. Care must be exercised to ensure that the lower layer 901 is not penetrated. As shown in FIG. 11d, the space left by the removal of the inner core is filled with a quantity of a resin 906, such as epoxy or polyurethane.

Figure 11E:
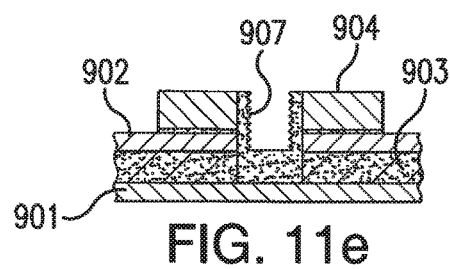
Figure 11F:
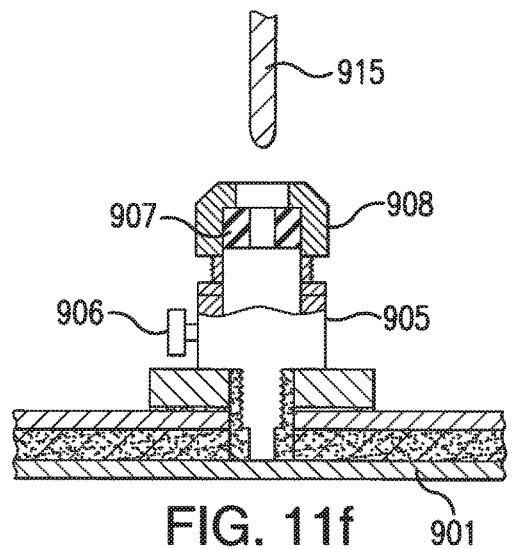
Figure 11G:
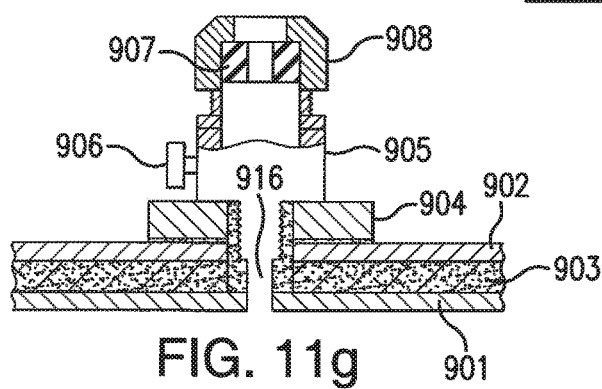
Figure 11H:
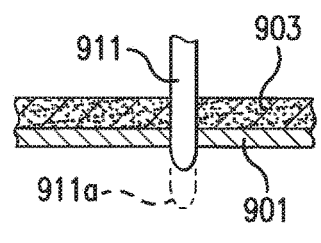

As shown in FIG. 11e, a threaded hole 907 is tapped in the hardened resin. A valve assembly 906 and gland assembly including a compressible seal 907 are attached to the threaded backing plate 904 as shown in FIG. 11f. A drill bit 915 is used to drill a hole through the resin 907 and outer layer 901. This is accomplished by passing the drill bit 915 through the compression seal 907 and open valve 906. Once the hole has been drilled, the drill bit is removed and the valve 906 is closed. An electrode 911 is inserted through the compressible seal 907 (FIG. 11g), valve 906, and the opening 916 in outer layer 901. With the valve assembly 906 closed, the electrode 911 is inserted into the compressible seal 907. The rubber seal is sized so as to provide a snug fit such that no water can leak into the boat. The valve 906 is then opened, and the electrode 911 is inserted a pre-measured distance such that the electrode tip 911a extends slightly beyond the outer surface of the hull 901. To prevent leakage in this position, the top nut 908 is tightened, whereby the seal 907 is compressed further against the electrode body 911. As shown in FIG. 11h, the electrode 911 can be positioned to be either flush with the outer surface of the hull, or to protrude slightly into the flow.

In the previously described embodiment of FIG. 4a, the sensor 100 is compatible with a standard hull penetrator and allows for the electrodes 114 to be removed without water intrusion. Similarly, in the embodiment of FIG. 12, the electrodes 1011 are contained within guide tubes 1007 that extend through a sensor body 1001 that is compatible with a standard hull penetrator 1002 and which allows for the electrodes to be removed without water intrusion. However, in this embodiment, the electromagnetic coil 1010 is annular and is placed internally of the hull 1004 concentrically about the hull penetrator 1002. Such a configuration allows for a larger volume of water to be energized by the magnet than those configurations where the magnet is embedded within a structure that wholly fits inside of a standard penetrator. The magnetic field of this annual coil is spread over a wider volume but is limited in the depth of penetration into the water. A sensor body 1001 that fits inside a standard penetrator 1002 contains guide channels 1007 for respectively receiving a plurality of removable electrodes 1011. A plurality of valves 1012 are placed at the top of the sensor body 1001 such that each electrode must pass through the combination valve (or compression seal) prior to passing through a plurality of guide channels 1007 before being installed at such a position so as to be in contact with the water at the outer portion of the boat hull.

Figure 12:
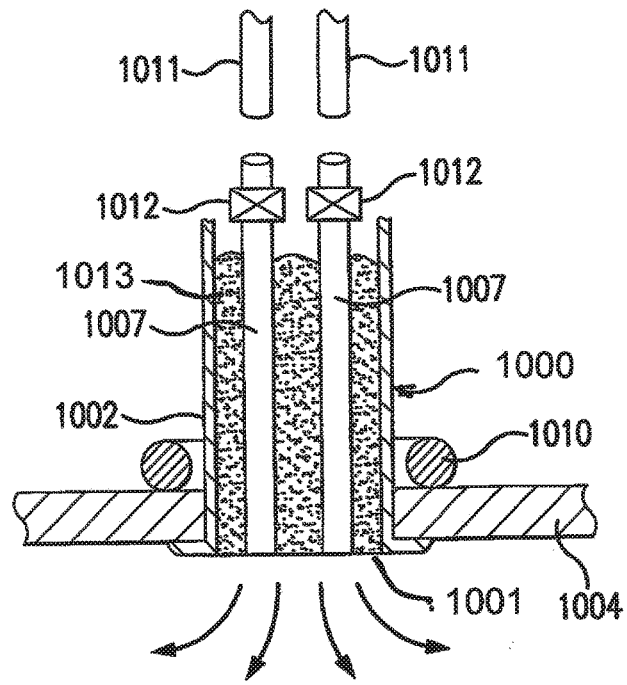
FIG. 12 is a sectional view of an electrode assembly utilizing a standard hull penetrator, wherein the magnet assembly is annular and is placed inside the boat concentrically about the hull penetrator.
Figure 13:
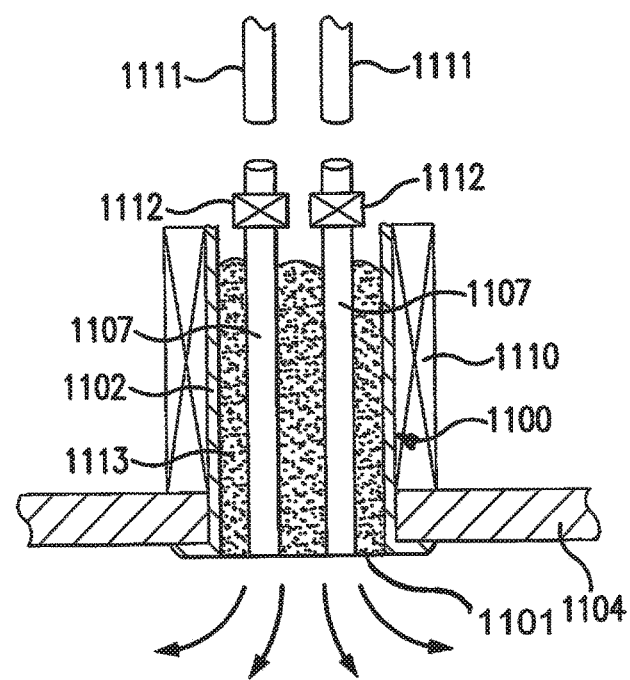
FIG. 13 is a sectional view of an electrode assembly utilizing a standard hull penetrator, wherein the magnet assembly is solenoid-shaped and is concentrically arranged about the hull penetrator.

In the embodiment of FIG. 13, the electrodes 1111 are also contained within passages 1107 and potting layer 1113 of a sensor body 1101 that is compatible with a standard hull penetrator 1102 A plurality of self-sealing valves 1112 connected in the guide tubes 1107, respectively, permit the electrodes to be removed without water intrusion. Additionally the magnet assembly 1110 has a solenoid shape which will establish a magnetic field that extends deeper into the water than does the annular configuration. Such a configuration provides less sensitivity to disturbances at the hull than does the annular one. This solenoid electromagnetic assembly 1110 is placed on the inside of the hull 1104 and is positioned concentrically about the hull penetrator 1102. Thus, the electromagnetic assembly can also be removed while the boat is in the water. Such a configuration allows for a larger volume of water to be energized by the magnet than those configurations where the magnet is embedded within a structure that wholly fits inside of a standard penetrator or, as in FIG. 12, is of the annular shape.

The configurations of FIGS. 12 and 13 are designed for use with a standard hull penetrator 1002, 1102. In these configurations, only one sensor body is used. As in FIG. 4a, the self-sealing valves 1012, 1112 are placed at the top of the assembly. The electrodes are grouped inside of a molded sensor body 1001, 1101 that allow for the easy installation and removal. In FIG. 12 the magnet 1010 is of annular shape and is large enough (approximately 2 inches) to be placed around the hull penetrator on the inside of the hull. However, being relatively small and of the annular shape the depth of penetration is limited. In FIG. 13 the magnet 1110 is of solenoid shape and is large enough (approximately 2 inches) to be placed around the hull penetrator 1102 on the inside of the hull 1104. Because this coil has a substantial length-to-diameter and a magnetic permeable core the magnetic field extends into the water further than any of the configurations that utilize the standard hull penetrator. The coil can be replaced without interfering with the water integrity of the boat. The configuration of FIG. 13 is the most accurate of any configurations that utilize the standard hull penetrator 1102.

Referring again to the embodiment of FIG. 8a, the electromagnetic assembly typically has a diameter much larger than that of the configuration of FIG. 12. In the first configuration, the electrodes 514 are placed inside of the circle formed by the annular coil and are individually inserted through the hull using individual valves 512 and compression fittings. Hence, the electrodes can be easily removed for cleaning or repair. Additionally the magnet coil can also be removed without removing the boat from the water. The large coil and greater distances between the electrodes makes this configuration the least sensitive to variations in water flow around the hull. The configuration of FIG. 8a is preferred for those boats where accuracy and repeatability is of highest concern.

Figure 14A:
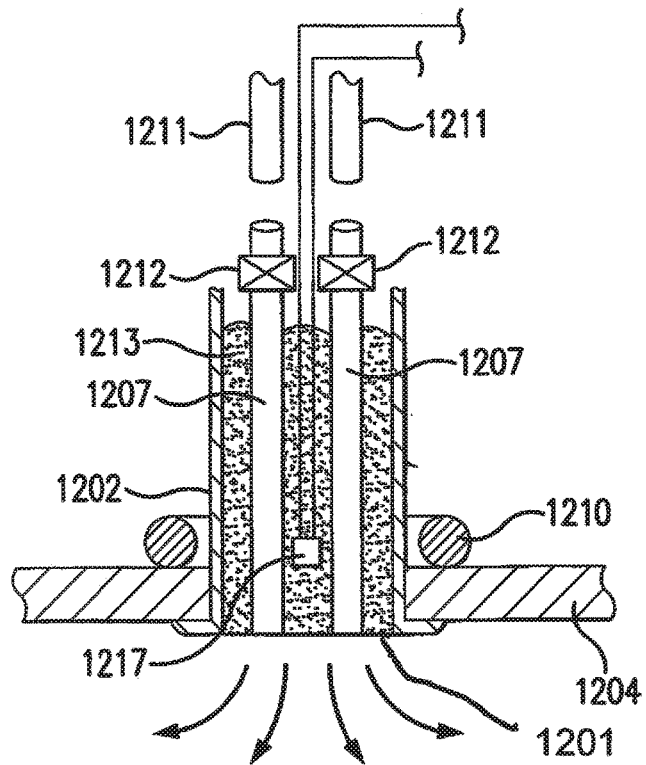
FIGS. 14a-14c are sectional views illustrating the locations of Hall Effect devices for monitoring the magnetic field strength for sensors having different electromagnetic devices, respectively.
Figure 14B:
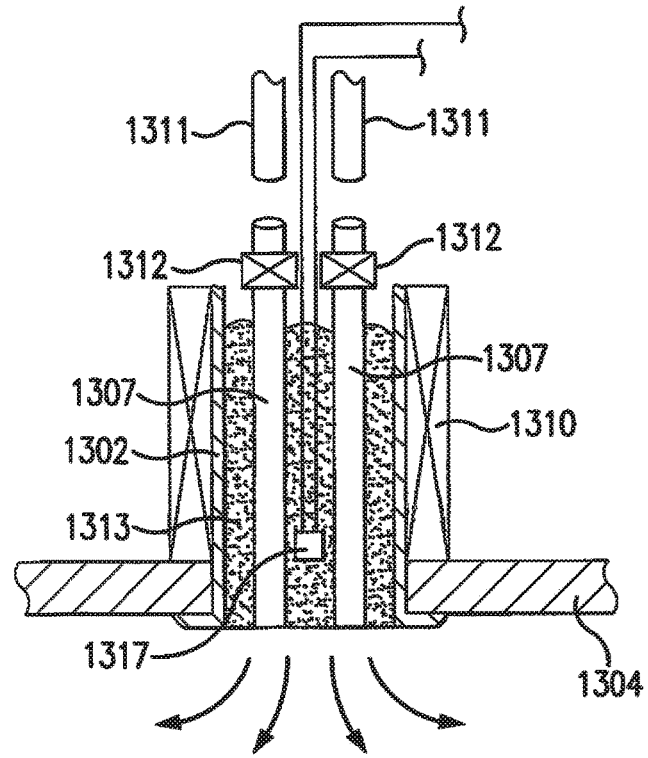
Figure 14C:
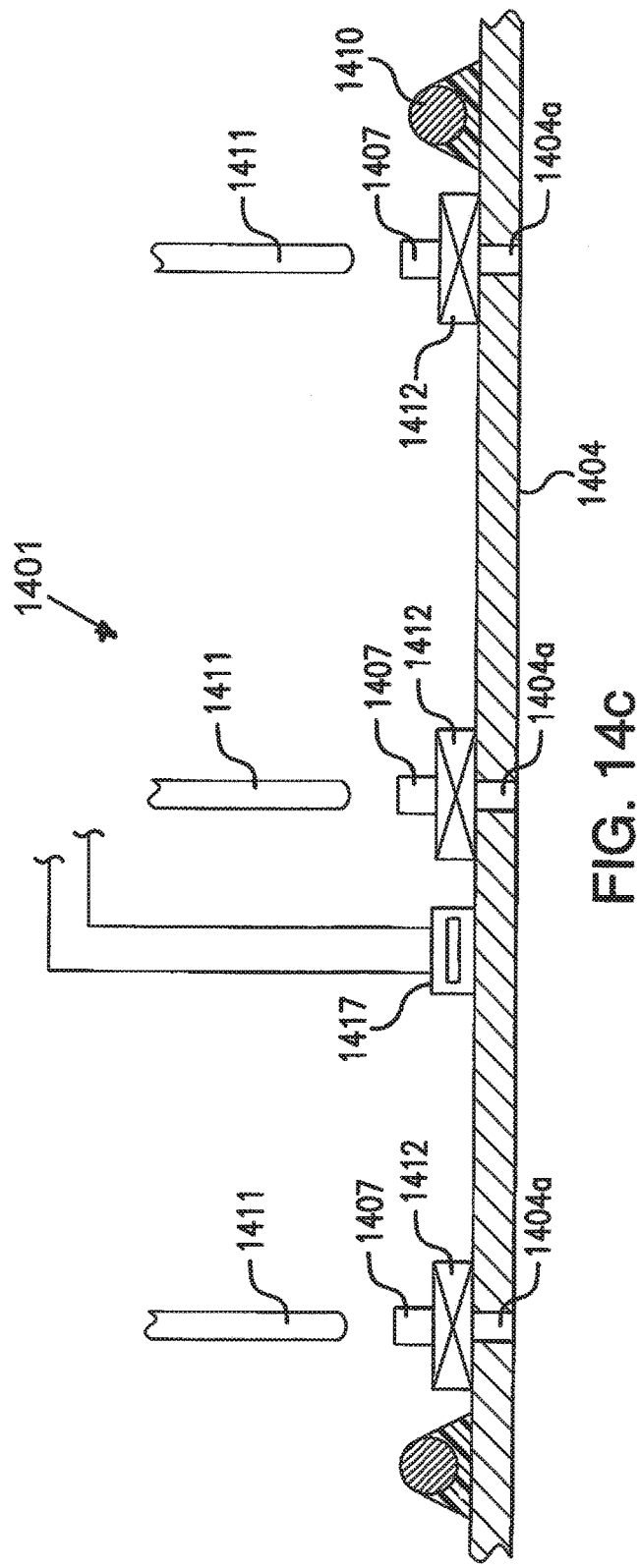

FIGS. 14a, 14b and 14c illustrate three locations of a Hall Effect device that can be used for monitoring the strength of the magnetic field. In many of the sensor configurations the relationship between the location of the electrode tips and the magnet relative to the hull 1204, 1304, and 1404 is known and remains constant since they typically reside within the same structure. However, when the magnets 1210, 1310 and 1410 and electrodes 1211, 1311, and 1411 are separately removable, then it is possible that the strength of the magnetic field that energizes the water may be affected if the magnet assembly were to be positioned differently than when the sensor was calibrated. Since the calibration of the sensor is directly proportional to the strength of the magnetic field, it is important to minimize any effects of such a repositioning of the magnet. In FIG.

14a, the Hall Effect device 1217 is located within the structure of the potting layer 1213 that is arranged within the standard hull penetrator 1202 and holds the electrode guide passages 1207. If annular coil 1210 were to be repositioned, then the Hall Effect device 1217 would detect the change in field strength, and report this change to the processing electronics so that the calibration of the sensor would remain unchanged. In FIG. 14*b*, the Hall Effect device 1317 is located within the potting layer 1313 of the sensor body 1301 that is arranged within the standard hull penetrator 1302 and holds the electrode channels 1307. If solenoid shaped coil 1310 were to be repositioned, then the Hall Effect device 1317 would detect the change in field strength and report this change to the processing electronics so that the calibration of the sensor would remain unchanged. In FIG. 14*c*, the Hall Effect sensor 1417 is placed near the center of the coil 1410 and directly against the inside hull 1404 of the boat adjacent the hull openings 1404*a*. If annular coil 1410 were to be repositioned relative to the electrode support arrangement 1401, then the Hall Effect device 1417 would detect the change in field strength and report this change to the processing electronics, so that the calibration of the sensor would remain unchanged. The valves 1212, 1312, and 1412 close the passages 1207, 1307, and 1407 upon removal of the electrodes 1211, 1311, and 1411, respectively.

FIGS. 15*a*-15*e* illustrate how additional sensors can be added to a retrofit configuration that does not have any speed components except for the electrode assembly. FIG. 15*b* shows the electrode assembly body 1880 that is removably mounted with the standard tubular penetrator, and that includes O-ring seals 1814. The centerlines 1807*a* of the guide tubes 1807 for the electrodes 1811 are shown. The five electrode guide tubes 1807 are arranged at the outer perimeter of the assembly. This maximum separation allows for two advantages: namely, the detected flow signals are greater for greater electrode separation, and the space 1882 in the center of the assembly is maximized, thereby allowing for positioning additional sensors, such as depth and temperature sensors. As shown in FIG. 15*b*, the space can accommodate a piezoelectric crystal 1883 that is often used in ultrasonic depth devices as well as a temperature sensor 1884 that can measure water temperature. As shown in FIG. 15*a*, the piezoelectric crystal 1883 is placed near the bottom portion of the assembly and is potted with an epoxy material layer 1813 that enhances the propagation of the ultrasound into the water. A temperature sensor can also be placed in an available cavity near the bottom of the assembly and also is potted in place by the potting layer 1813. The crystal 1883 is shown in FIG. 15*d*, and the temperature sensor 1882 is shown in FIG. 15*e*. The dummy plug 1820 with dummy electrodes 1821 is shown in FIG. 15*f*.

FIGS. 16*a*-16*f* illustrate the preferred locations for the electromagnetic speedometer for outboard and inboard runabout hulls, step hulls, sailboat hulls, inboard hulls, and fin keel sailboat hulls, respectively.

Figure 17:
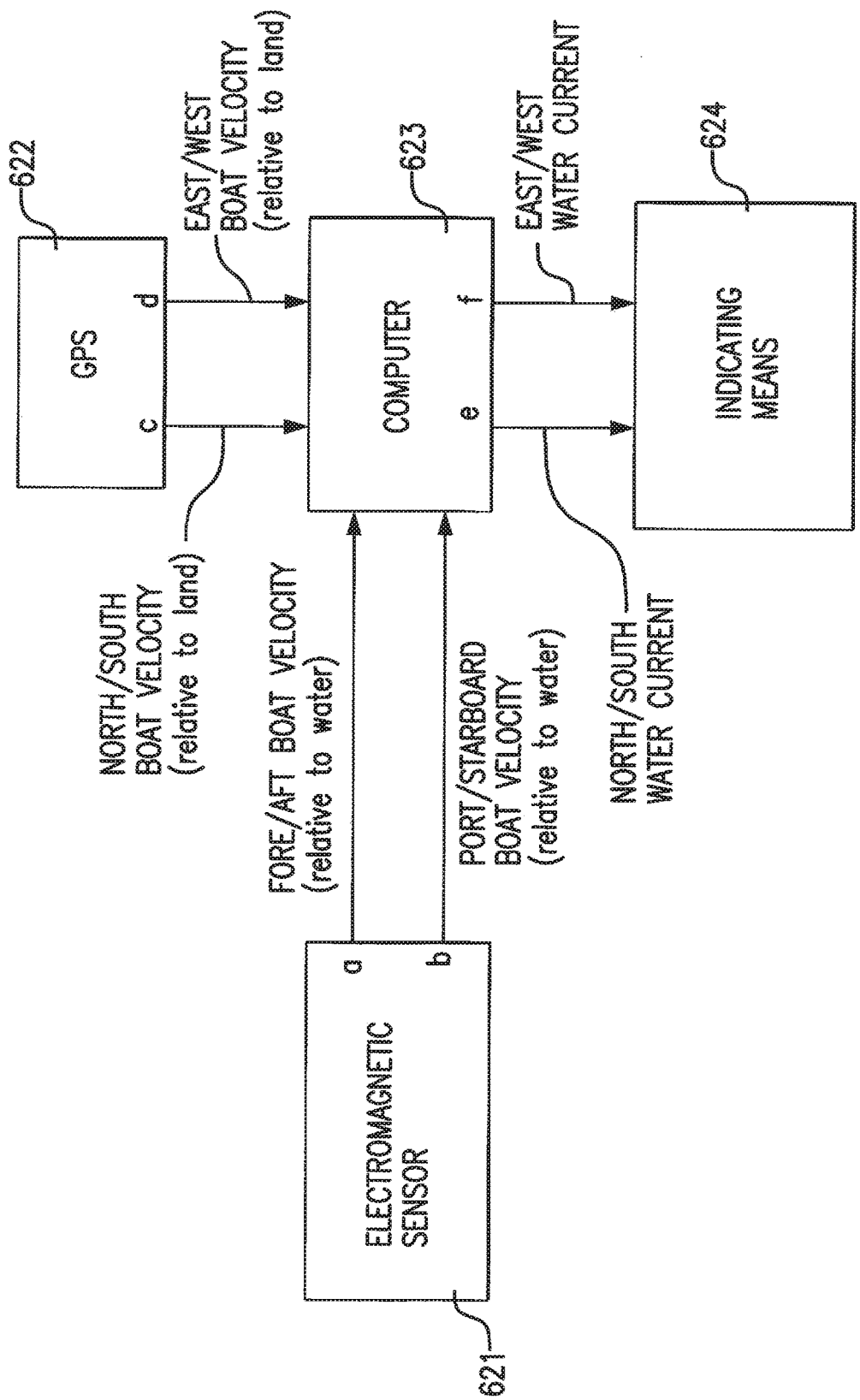
FIG. 17 is a block diagram illustrating the combination of GPS signals with the forward speed and leeway signals, thereby to obtain direct measurement of the local currents that exist in the water.

FIG. 17 illustrates the manner in which the two-axis boat speedometer can be interfaced with an onboard global positioning system 622 to yield the water currents that exist in the body of water being traversed by the boat. The electromagnetic sensor 621 provides two outputs, namely, one output "a" representing the fore/aft velocity of the boat relative to the water, and the other output "b" representing the port/starboard velocity of the boat relative to the water. The onboard GPS system 622 typically supplies two outputs, one output "c" representing the North/South velocity of the boat relative to land, and the other output "d" representing the East/West velocity of the boat relative to land. The two signals from the electromagnetic sensor and the two signals from the GPS are combined in computer 623. By subtracting the speed of the ship through the water from the speed of the ship over land, the velocities of the North/South and East/West water current signals "e" and "f" relative to land can be calculated and supplied to indicating means 624.

FIG. 18 illustrates the manner in which the Hall effect device is connected with the electronic circuitry to maintain the proper calibration in the event that the strength of the magnetic field changes from that which existed during calibration. The Hall effect device 2060 is monitored by computer 2023. The strength of the magnetic field detected by the Hall effect device 2060 is used to modify the velocity signals from the electromagnetic sensor 2021 so as to maintain the system calibration if the strength of the magnetic field should change from the value recorded during a previous system calibration.

While in accordance with the provisions of the Patent Statutes the preferred forms and embodiments of the invention have been illustrated and described, it will be apparent to those skilled in the art that changes may be made without deviating from the invention described above.

What is claimed is:

1. An electromagnetic speedometer suitable for use in a boat including a hull having an upper interior surface and a lower exterior surface in contact with a body of water, the hull containing a plurality of spaced through openings, comprising:
   (a) a plurality of electrode assemblies arranged adjacent to respective through openings in the boat hull, each of said electrode assemblies including
      (1) a penetrator valve mounted on the hull upper surface and surrounding a respective through opening; and
      (2) an electrode supported by each penetrator valve for insertion and removal from the respective through openings in the boat hull, said electrodes each having a tip at one end to engage the water when said electrodes are inserted into the respective through openings, said penetrator valves permitting removal of said electrodes and cleaning of the electrode tips when the boat is in the water while preventing water from entering the boat;
   (b) an annular coil adapted for mounting on the boat hull upper interior surface and having an inner diameter extending beyond the through openings in the boat hull, said penetrator valves and said electrodes being arranged in spaced relation within said inner diameter of and separate from said annular coil, said annular coil being configured to establish an electromagnetic field in the water large enough to allow a speed measurement to be made by said electrodes substantially away from boundary layer influences resulting from movement of the boat hull; and
   (c) a velocity measuring circuit including a plurality of conductors, respectively connected with other ends of said electrodes, said velocity measuring circuit generating a velocity signal in response to speed measurements from said electrodes.

2. An electromagnetic speedometer as defined in claim 1, wherein each of said penetrator valves is operable between closed and open positions.

3. An electromagnetic speedometer as defined in claim 1, wherein said penetrator valves comprise self-sealing flapper valves.

4. An electromagnetic speedometer as defined in claim 1, and further comprising a plurality of dummy electrodes supported by said penetrator valves, respectively, when said electrodes are removed for cleaning.

5. An electromagnetic speedometer as defined in claim 1, wherein said tips of said electrodes are arranged in a predetermined pattern relative to the longitudinal axis of the boat.

6. An electromagnetic speedometer as defined in claim 1, and further including a Hall effect device arranged within said annular coil adjacent the hull, said Hall effect device being connected with said velocity measuring circuit.

7. An electromagnetic speedometer as defined in claim 1, and further including a global positioning system for modifying a velocity signal produced by said electrodes.

8. An electromagnetic speedometer as defined in claim 1, wherein said electrodes are arranged on an inner diameter of said annular coil that is between 75% and 90% of said coil inner diameter.

9. A method for measuring the speed of a boat moving through a body of water, comprising the steps of
   (a) creating a plurality of spaced through openings in a hull of the boat;
   (b) mounting a plurality of electrode assemblies on an upper surface of the boat hull, and surrounding each of said through openings, respectively, each electrode assembly including a penetrator valve and an electrode removably supported by said penetrator valve for insertion and removal from the adjacent through opening, each electrode having a tip at one end to engage the water when the electrodes are inserted into the respective through openings, the penetrator valves permitting removal of the electrodes and cleaning of the electrode tips while the boat is in the water;
   (c) mounting an annular coil on the boat hull upper surface, the coil having an inner diameter extending beyond the through openings in the boat hull with the electrode assemblies being arranged in spaced relation within the inner diameter and separate from the annular coil, the annular coil being configured to establish an electromagnetic field in the water large enough to allow a speed measurement to be made by the electrodes substantially away from boundary layer influences resulting from movement of the boat hull through the water; and
   (d) connecting a velocity measuring circuit with the electrodes to generate a velocity signal in response to speed measurements from the electrodes.

* * * * *